US008373962B2

United States Patent
Diehl

(10) Patent No.: US 8,373,962 B2
(45) Date of Patent: Feb. 12, 2013

(54) CHARGED SEED CLOUD AS A METHOD FOR INCREASING PARTICLE COLLISIONS AND FOR SCAVENGING AIRBORNE BIOLOGICAL AGENTS AND OTHER CONTAMINANTS

(75) Inventor: Steve Ray Diehl, Colorado Springs, CO (US)

(73) Assignee: Exelis Inc., McLean, VA (US)

( * ) Notice: Subject to any disclaimer, the term of this patent is extended or adjusted under 35 U.S.C. 154(b) by 1581 days.

(21) Appl. No.: 11/838,938

(22) Filed: Aug. 15, 2007

(65) Prior Publication Data
US 2012/0123181 A1  May 17, 2012

Related U.S. Application Data

(60) Provisional application No. 60/838,381, filed on Aug. 18, 2006.

(51) Int. Cl.
*H05F 3/00* (2006.01)
(52) U.S. Cl. .......................... 361/212; 361/213
(58) Field of Classification Search .................. 361/212, 361/213, 218, 231
See application file for complete search history.

(56) References Cited

U.S. PATENT DOCUMENTS

| 1,928,963 A | * | 10/1933 | Chaffee ........................ 239/2.1 |
| 3,802,625 A |   | 4/1974  | Buser et al. |
| 4,671,805 A | * | 6/1987  | Gourdine ......................... 95/71 |
| 2004/0134997 A1 | * | 7/2004 | Khain et al. ................. 239/14.1 |

FOREIGN PATENT DOCUMENTS

| JP | 4322723 | 11/1992 |
| JP | 2001286546 | 10/2001 |
| WO | 2005/053379 A1 | 6/2005 |
| WO | 2005053379 A1 | 6/2005 |

OTHER PUBLICATIONS

Examination Report in counterpart European Application No. 07814158.7, mailed Sep. 14, 2011.
PCT International Search Report and Written Opinion in counterpart International Application No. PCT/US07/76079, dated Jul. 3, 2008.
Office Action (with English translation) in counterpart Japanese Application No. 2009-524800, mailed Feb. 7, 2012.

* cited by examiner

*Primary Examiner* — Danny Nguyen
(74) *Attorney, Agent, or Firm* — Edell, Shapiro & Finnan, LLC

(57) ABSTRACT

A system and method is provided for increasing interaction between seed particles in a seed cloud and target particles to be neutralized, detected or knocked down to the ground. This is achieved by applying a charge to the seed particles so that the seed cloud formed by release of the seed particles at altitude is highly charged, which in turn produces a strong electric field between the seed cloud and ground. The relatively strong electric field causes the seed particles to move downward (toward the ground) at a velocity sufficient to increase interaction (collisions) between the seed particles and the target particles.

12 Claims, 7 Drawing Sheets

```
                                    ┌─ 510
                    ┌───────────────────────────────────────┐
                    │ DEPLOY AIR VEHICLE AIRBORNE ABOVE TARGET PARTICLES │
                    └───────────────────────────────────────┘
        520 ─┐              │                    ┌─ 525
             ▼              │                    ▼
┌──────────────────────────┐│  ┌──────────────────────────────────────┐
│ APPLY CHARGE (E.G., POSITIVE CHARGE) │ │ RELEASE FROM THE AIR VEHICLE PARTICLES │
│ TO SEED PARTICLES AND RELEASE THE │ │ THAT ARE OPPOSITELY CHARGED WITH │
│ SEED PARTICLES FROM THE AIR VEHICLE │ │ RESPECT TO THE CHARGE OF THE SEED │
└──────────────────────────┘  │ PARTICLES TO MAINTAIN CHARGE NEUTRALITY │
   530 ─┐ │                   │ OF THE AIR VEHICLE, AND WHICH │
        ▼                     │ OPPOSITELY CHARGED PARTICLES ARE │
┌──────────────────────────┐  │ HEAVIER THAN THE SEED PARTICLES SO │
│ SEED CLOUD IS FORMED AT ALTITUDE │ │ THAT THEY FALL TO THE GROUND AND DO NOT │
│ ABOVE THE GROUND TO PRODUCE AN │ │ INTERACT WITH THE SEED CLOUD │
│ ELECTRIC FIELD E BETWEEN THE SEED │ └──────────────────────────────────────┘
│ CLOUD AND GROUND │
└──────────────────────────┘
        │
        ▼
┌──────────────────────────┐
│ ELECTRIC FIELD PRODUCED BY THE SEED │
│ CLOUD CAUSES THE SEED PARTICLES (AT │
│ BOTTOM OF SEED CLOUD) TO MOVE │ ─ 540
│ DOWNWARD AT SUFFICIENT VELOCITY TO │
│ INCREASE INTERACTION BETWEEN THE │                500
│ SEED PARTICLES AND TARGET PARTICLES │
└──────────────────────────┘
        │
        ▼
┌──────────────────────────┐
│ ELECTRIC FIELD PRODUCED BY THE │
│ CHARGED SEED CLOUD INDUCES A │
│ DIPOLE CHARGE DISTRIBUTION IN TARGET │ ─ 550
│ PARTICLES SO THAT THE TARGET PARTICLES │
│ ARE ATTRACTED TO THE SEED PARTICLES │
└──────────────────────────┘
```

FIG.7

CHARGED SEED CLOUD AS A METHOD FOR INCREASING PARTICLE COLLISIONS AND FOR SCAVENGING AIRBORNE BIOLOGICAL AGENTS AND OTHER CONTAMINANTS

RELATED APPLICATIONS

This application claims priority to U.S. Provisional Application No. 60/838,381, filed Aug. 18, 2006, the entirety of which is incorporated herein by reference.

BACKGROUND OF THE INVENTION

Efforts exist for investigating the generation of clouds of seedant particulates to detect and or neutralize or knockdown airborne agents of biological origin, such as Anthrax. The effectiveness of this technique is limited by the number of collisions between seedant particulates and the target particles.

The probability of collision between the particles in the atmosphere is so small that large quantities of seed particles may be required, making such concepts impractical. Target particles of a biological type are too large for Brownian motion to efficiently diffuse them, yet below the size where inertial impact routinely takes place with other particles due to turbulence found in the atmosphere. Thus, the seed particles and target particles will seldom come in contact with each other. Techniques are needed for overcoming this problem.

SUMMARY OF THE INVENTION

Briefly, a method is provided for increasing interaction between seed particles in a seed cloud and target particles to be neutralized, detected or knocked down to the ground. This is achieved by applying a charge to the seed particles so that the seed cloud formed by release of the seed particles at altitude is highly charged, which in turn produces a strong electric field between the seed cloud and ground. The relatively strong electric field causes the seed particles to move downward (toward the ground) at a velocity sufficient to increase interactions between the seed particles and the target particles.

BRIEF DESCRIPTION OF THE DRAWINGS

FIG. 7 is a flow chart depicting the method according to embodiments of the present invention.

DETAILED DESCRIPTION

The present invention is directed to a system and method for dispersing seed particle clouds with a charge on each seed particle so that the cloud formed by their release is highly charged, which then produces a strong electric field between the cloud and the ground. The strong electric field causes the particles at the base of the seed cloud to migrate downward at a sufficient velocity to intercept numerous target particles. Furthermore, the strong charge on the seed particles will attract target particles to them, further increasing the effective volume of space swept out by each seed particle. Thus, by dispersing a charged seed cloud in this manner, the number of interactions with the target particles is greatly increased or improved.

Figure 1:
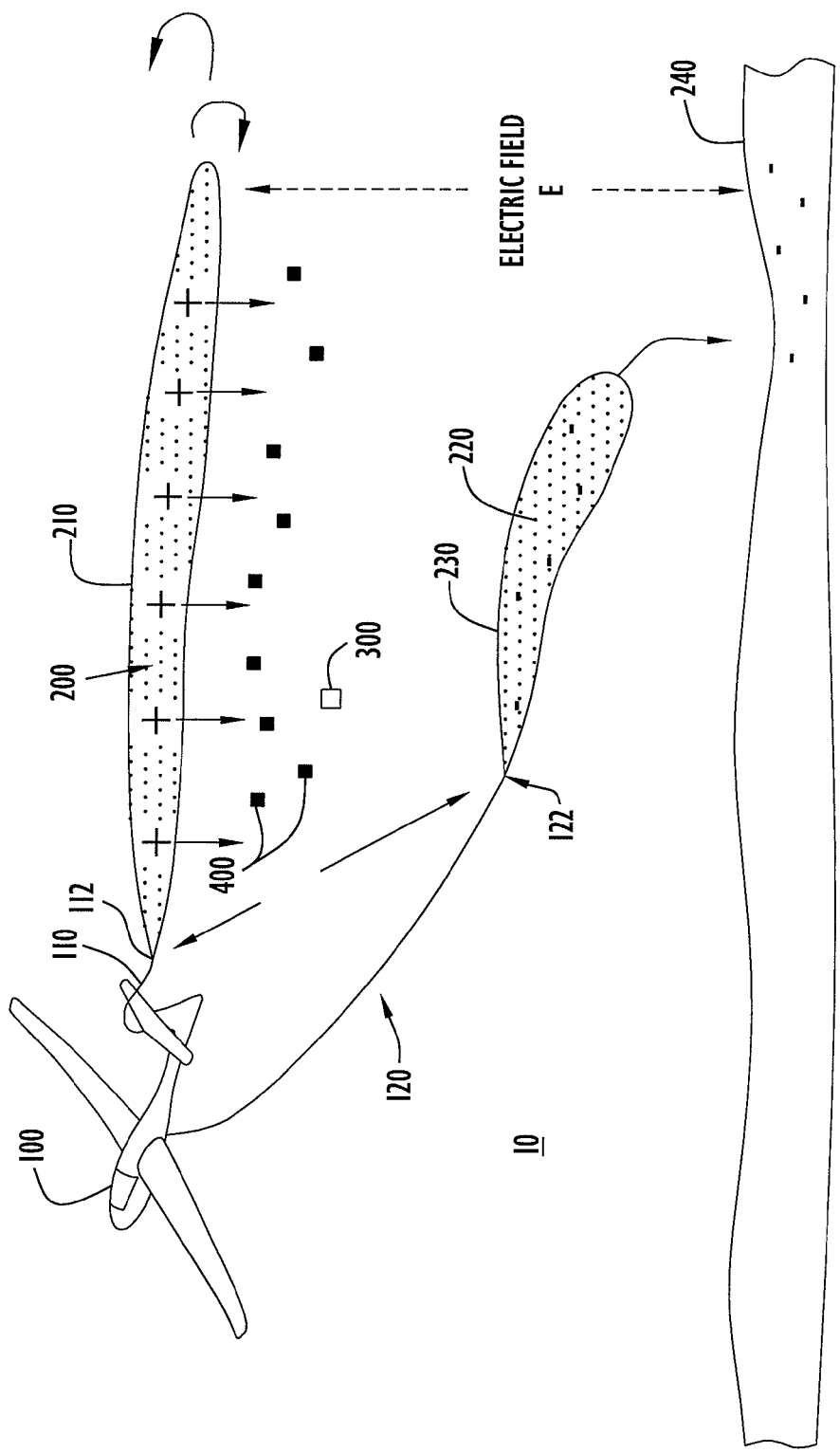
FIG. 1 is a diagram depicting a system and method for dispersing a charged seed cloud for the purpose of increasing particle interactions according to an embodiment of the invention.

Referring first to FIG. 1, a system according to an embodiment of the present invention is described. The system, generally indicated by reference numeral 10, comprises an air vehicle 100 comprising a first tube 110 and a second tube 120. The aerial vehicle 10 may be an aircraft (manned or unmanned), a missile, a glider, helicopter etc. The first and second tubes, 110 and 120, extend from the air vehicle 100 such that the distal end 112 of the first tube 110 is at an altitude above the distal end 122 of the second tube 120. The first tube 110 releases seed particles 200 at a first polarity (e.g., a positive, "+", charge) to form a positively charged seed cloud 210. A relatively small amount of seed particles 200, for example 10 kg, can produce an effective coverage area of over 200 m by 500 m, and possibly more. With even higher concentrations of charged particles, the seed particle agglomeration and migration could be used to remove target particles from the air by carrying them to the ground. As shown in FIG. 1, the charged seed particles 200 are released from the first elongated tube 110 at an appropriate altitude to form a cloud of charged particles above a volume of air that contains target particles 400 to be identified, eliminated or neutralized. The term "interaction" describes a desired impact or affect the seed particle is to have on target particles and is meant to include, without limitation, identification of the target particle through remote sensing, neutralizing the target particle by making it no longer (chemical and/or biologically) harmful, eliminating the target particles by chemically reacting with it so that it is no longer present in its original form, and forcing the target particles to the ground where they can be further contained, tracked, removed and/or studied/analyzed for identification.

In order to maintain overall charge neutrality of the air vehicle 100, the second tube 120 releases "heavy" (heavier than the seed particles 200) particles 220 at a polarity (e.g., a negative, "−", charge) opposite that of the charged seed particles 200 to form a charged particle cloud 230. The heavy particles 220 fall away toward the ground shown at reference numeral 240. For example, the heavy particles 220 are Iron (Fe) particles having a size of approximately 20 μm and would fall to the ground at a velocity of approximately 50 cm/sec. To ensure a sufficient charge on each seed particle 200, the distance separation between the air vehicle and the distal end 122 of the tube 120 that releases the heavy particles 220 may be on the order of 50 m or more to reduce the field strength near the air vehicle. The heavy particles 220 have sufficient mass so that they that they fall away from the air vehicle 100 and do not interact with the charged seed cloud 210. Again, the release of the heavy particles 220 is needed to counter any overall charge imbalance impact on the air vehicle 100 as a result of releasing the charged seed particles 200, without which the charge buildup on the air vehicle 100 would restrict the release of additional charged seed particles 210. For simplicity, the seed particles 200 are also referred to herein as "first" particles and the heavy particles 220 are also referred to herein as "second" particles.

Deployment of the charged seed cloud 210 produces a strong electric field E between the charged seed cloud 210 and the ground (having a generally negative charge) as shown at reference numeral 240. The strong electric field causes the seed particles 200 at the base of the seed cloud 210 to migrate downward at a sufficient velocity to intercept numerous target particles. In addition, the strong charge on the seed particles 210 attract target particles to them, further increasing the effective volume of space swept out by each seed particle. Thus, the charged seed cloud 210 greatly increases the number of interactions between the seed particles and target particles. Interaction between a seed particle and a target particle is as shown at reference numeral 300 and described in more detail hereinafter in conjunction with FIG. 2.

The type of seed particle used depends on whether the seed particle is to interact with the target particle to neutralize the target particle, make the target particle detectable using any of a variety of detection techniques, or to cause (carry) the target particles to fall to the ground much more rapidly. The target particles may be any type of contaminant that is to be detected, neutralized and/or (in the case of airborne particles) brought to the ground. For example, and not by way of limitation, the target particle may be a bio-hazard agent, such as Anthrax.

Regardless of the particular aerial platform used, the dispersed cloud 210 of charged seed particles 200 produces its own electric field, E. The charged cloud 210 will draw charge of the opposite sign in the earth below it, creating a field from the cloud to the ground 240. The seed particles 200 at the bottom of the cloud 210 will experience the full effects of the electric field, but the field strength will decrease toward the top the cloud. Atmospheric dispersion may tend to disperse the cloud as well, mixing the seed particles 200 toward the ground 240. Once the heavy particles 220 fall to the ground, their charge may jump to vegetation and then to the earth itself, where they will travel under the charged seed cloud 210 as it blows with the wind. A similar effect occurs under thunder storms.

In one example, the amount of charge per seed particle 200 is on the order of 100 electrons. However, the charge strength could possibly be increased to improve performance. Generally, the number of charges per seed particle should remain below the level at which air breakdown occurs around each particle, resulting in the loss of some of the charge to background aerosols near the seed particles. In addition, the electric field between the cloud 210 and the air vehicle 100 may impede the amount of charge that can be placed on each seed particle 200. Variation or selection of the seed particle size may also yield an improvement in performance for certain applications.

By assuming that the seed cloud's horizontal size is much greater than its distance to ground, edge effects can be ignored when computing the electric field strength under the charged seed cloud 210. According to Gauss's law, an electric field strength of approximately 20,000 Volts/m below a charged seed cloud 210 is produced by the release of 10 kg of seed particles 200 spread over an area of 200 m by 500 m, where the charge per particle is 100 electrons per particle. Since the earth's fair-weather electric field strength is on the order of only 100 Volts/m, the electric field of the charged seed cloud 210 is substantially greater than (and thus will easily overcome) the electric field caused by the earth. Nevertheless, the charge sign on the seed particles 200 may be chosen so that the electric field of the charged seed cloud 210 is additive to the electric field of the earth.

In a 20,000 Volt/m electric field, a one micron seed particle with a 100 electron charge will travel downward (fall velocity toward earth) about 100 cm in approximately 8 minutes. In general, atmospheric turbulence will mix some of the seed cloud quite quickly down into the target particles and visa versa. For example, 20 kg of 1 µm seed particles of this charge strength produces an electric field between the cloud 210 and the ground 240 having a strength that is approximately 45,000 Volt/m. The fall velocity of the charge seed particles is approximately 0.5 cm/sec in this example. This increased fall velocity greatly enhances the collision rate (and thus interaction) between seed particles and target particles. Atmospheric turbulence will disperse some of the seed cloud toward the ground, as well as mix the target particles upward into the seed cloud. This also increases the percentage of target particles that can interact (agglomerate) with the seed particles.

Figure 2:
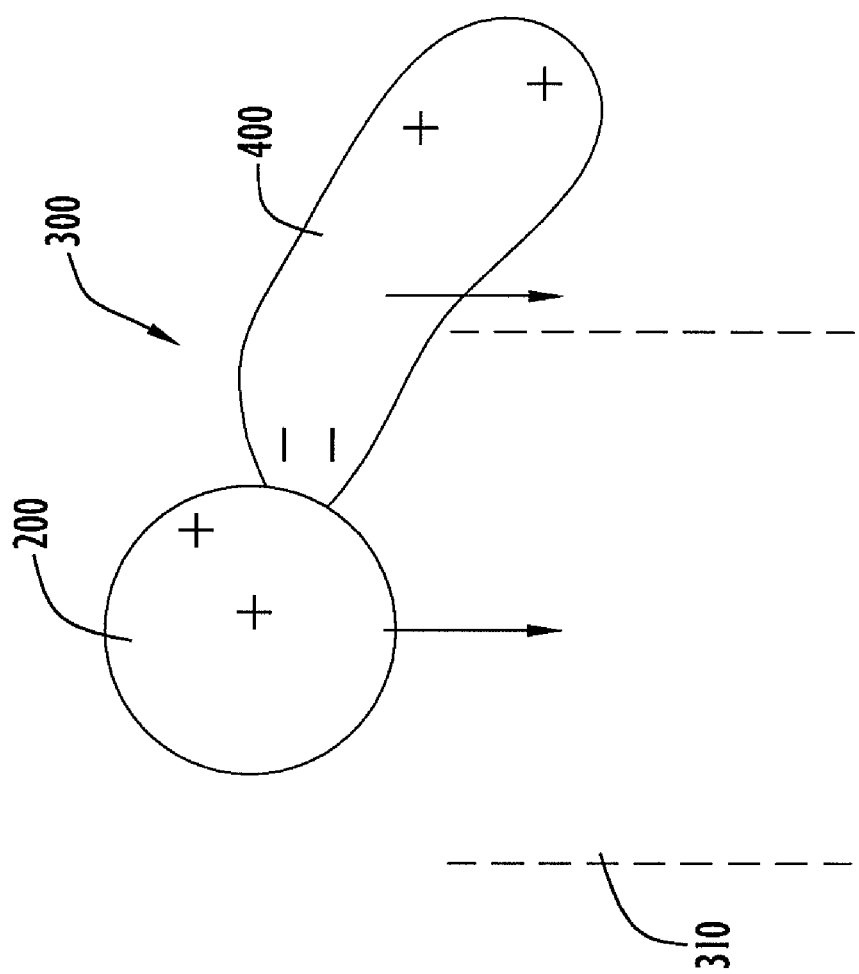
FIG. 2 is an exploded view illustrating interaction between a charged seed particle and a target particle as a result of the system and method according to the embodiments of the present invention.

With reference to FIG. 2, there is another mechanism that increases interaction between a charged seed particle 200 and a target particle 400. Due to the strong charge on the seed particles, the target particles and seed particles will be attracted and drawn to each other because the electric field produced by charged seed cloud 210 (FIG. 1) induces a dipole charge distribution in the target particle 400 as shown in FIG. 2. The negative charges of the dipole charge distribution imposed on the target particle 400 are attracted to the positive charges on the seed particle 200. Consequently, each seed particle will sweep out a "tube" shown at reference numeral 310 of target particles that is as large as 5 microns in diameter dependent on the shape of the seed particles and target particles. Under ideal conditions, as much as 10% of the target particles under the cloud will be intercepted as a result of the increased falling velocity and the charge interaction described in the above example. By assuming each particle sweeps out 25 square microns (0.0005 cm×0.0005 cm), 10 kg of seed particles, which contains over 1.E+16 particles, will produce an effective horizontal coverage area five times larger than the cloud area in this example.

Figure 3:
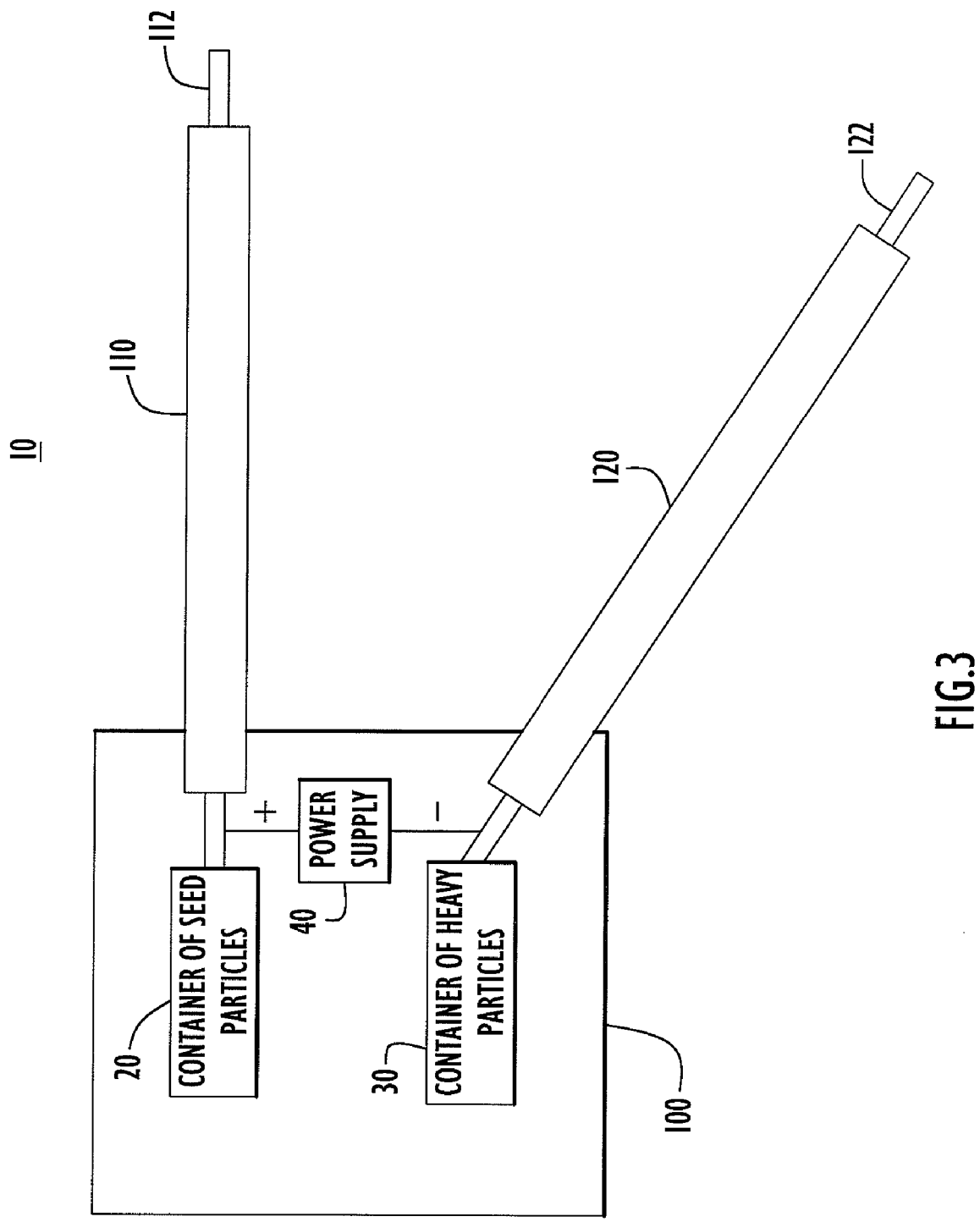
FIG. 3 is a block diagram illustrating components of a system according to an embodiment of the present invention.

Turning to FIG. 3, components of the system 10 are described according to one embodiment of the invention. For simplicity, the air vehicle 100 is shown as a box in FIG. 3. The system 10 comprises the first and second elongated tubes 110 and 120 referred to above. There is a pressurized container 20 that contains the seed particles and a pressurized container 30 that contains the heavy particles. The container 20 is coupled to the first elongated tube 110 and the container 30 is coupled to the second elongated tube 120. There is a power supply 40 having a positive terminal that is connected to a conductor that travels the length of the first tube 110 to the distal end 112 and a negative terminal that is connected to a conductor that travels the length of the second tube 120 to the distal end 122.

Figure 4:
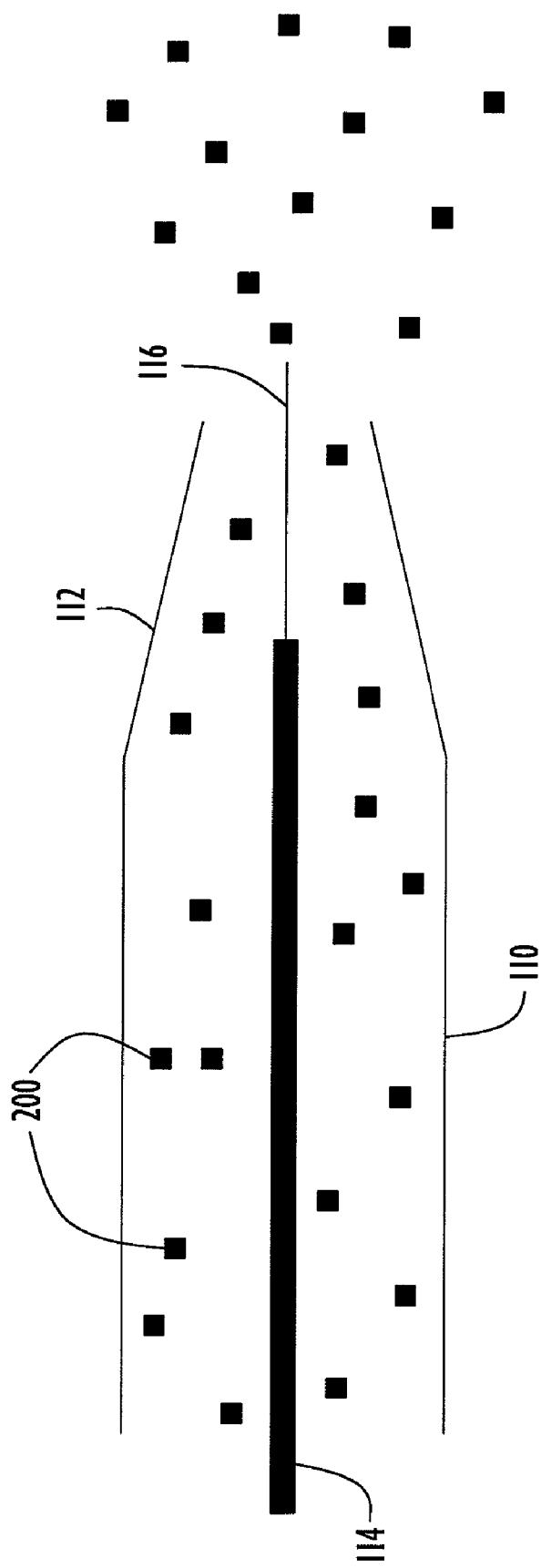
FIG. 4 illustrates a cross sectional view of a nozzle used in the system to deploy a charged particle cloud according to embodiments of the present invention.

Reference is now made to FIG. 4 that shows the details of the distal end 112 of the first elongated tube 110. It should be understood that the distal end 122 of the second elongated tube 120 has a similar structure. There is an electrical conductor 114 that travels the length of the tube 110 to the distal end 112. The electrical conductor or wire 114 may be positioned on the interior of the tube 110 (as shown in FIG. 4) or exterior to the tube 110 and contained inside an appropriate insulating material (not shown). There is a pin or needle-shaped electrically conductive member 116 that extends along a portion of the distal end 112 and outside of the distal end 112. The conductive member 116 is electrically connected to the conductor 114. When connected to a high voltage supplied by the power supply (FIG. 3), the member 116 charges the seed particles 200 that pass through the tube 110 and out of the nozzle-shaped distal end 112. The operating principles of the configuration shown in FIG. 4 are similar to that of conventional electrostatic air cleaners. It is understood that the tip of the conductive member 116 may reside inside the distal end 112 or within the tube itself 110; it need not extend outside of the nozzle-shaped distal end 112.

Figure 5:
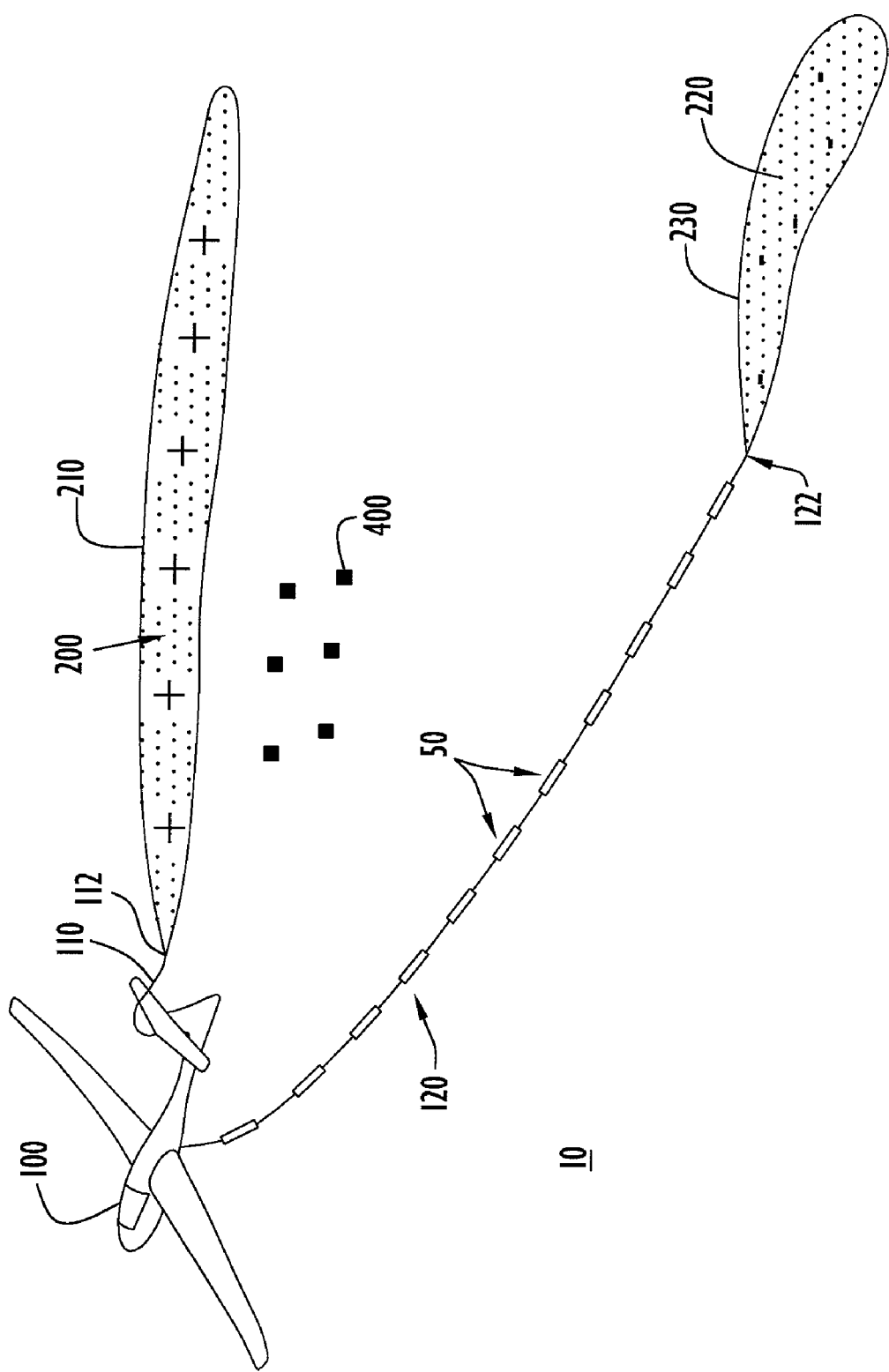
FIG. 5 is a diagram depicting a system for deploying charged seed particles in order to produce a downward migration of a charged seed cloud according to an embodiment of the invention.
Figure 6:
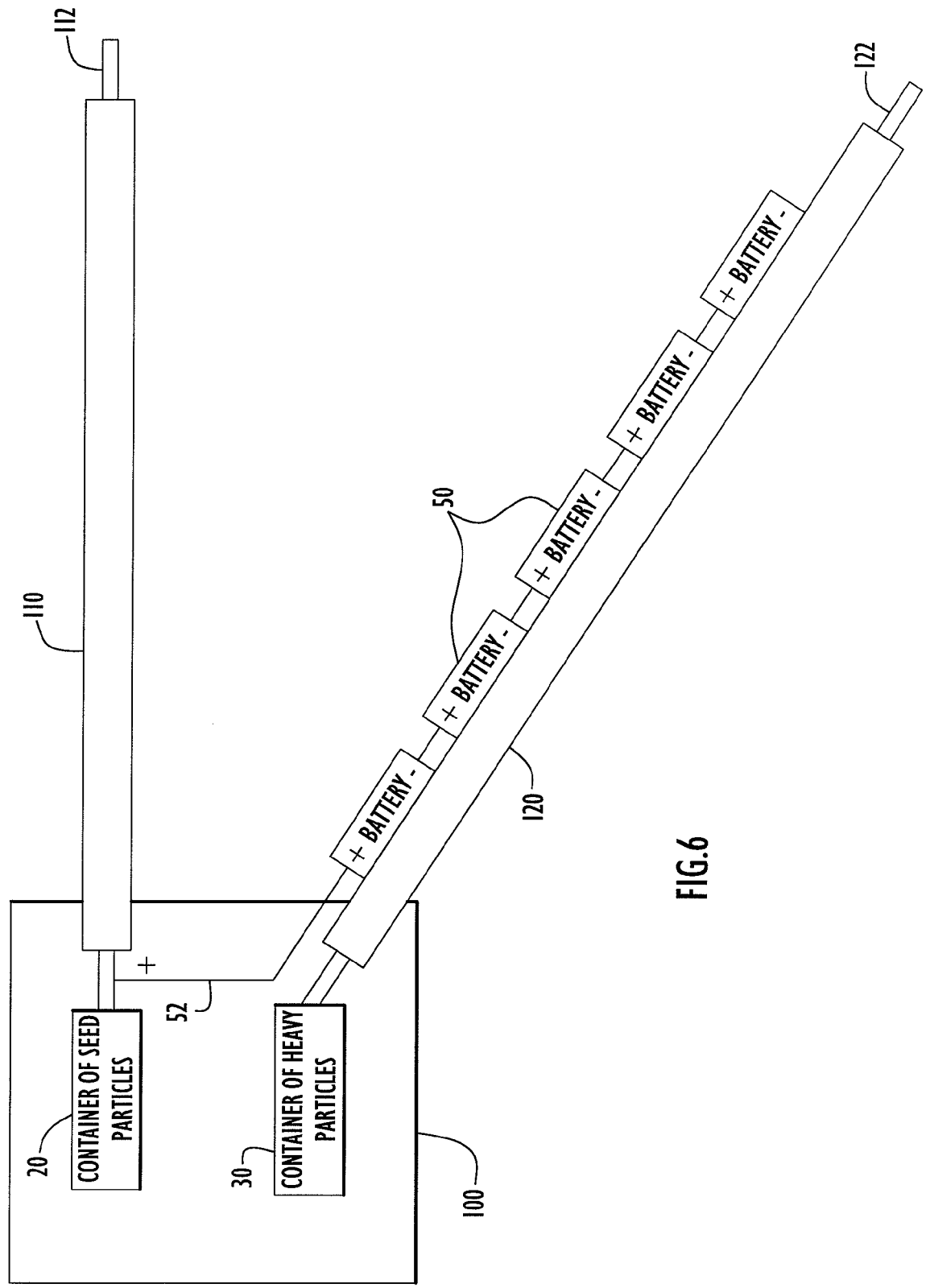
FIG. 6 is a block diagram illustrating components of the system depicted in FIG. 5 according to an embodiment of the invention.

FIGS. 5 and 6 illustrate another embodiment in which the power supply for the system 10 is in the form of a series of "isolated" battery-operated power supplies 50 along the length of the elongated tube 120. The positive terminal of the string of battery-operated power supplies 50 is connected via wire 52 to the conductor 114 that travels the length of the elongated tube 110, thereby supplying positive charge to the needle member in the needle member 116 to impose a positive charge on the seed particles. The negative terminal of the string of power supplies 50 is connected via a conductor 54 to needle member in the distal end 122 to impose a negative charge on the heavy particles. For example, each power supply 50 produces approximately 100,000 volts. The total energy required to charge 10 kg of 1 um particles with 100 electrons each is approximately 6.E+5 J, which is roughly the energy held in 40 Lithium AA batteries distributed along the elongated tube 120.

Examples of Applications for Which these Techniques May be Used Include (Without Limitation):

1. Detection of airborne biological or chemical agent particles (clouds/plumes)
2. Neutralization of airborne biological or chemical agent particles
3. Removal or scavenging of airborne biological or chemical agent particles
4. Removal or scavenging of other particulate contaminants (such as commercial contaminant, e.g., air pollutants, industrial pollutants, etc.)
5. Enhanced detection of biological or chemical agent residue residing on surfaces and vegetation The charge applied to the seed particles may be tailored to the application and desired end result. For example, for detection applications, the seed particles may be optimized to prevent detachment of the seed particles from target particles. On the other hand, for neutralizing applications, even just brief contact between the seed particles and the target particles may be sufficient. Furthermore, certain target particles may be made non-harmful (i.e., neutralized) as a result of the discharge between the seed particles and target particles. As an example, a few hundred high-energy electrons may be sufficient to vaporize a small hole in the cell wall of a harmful cell in a target particle.

Further still, the charged seed cloud technique also works well with target particles found on objects on the ground. Under these circumstances, the charge on the seed particles will neutralize to the object on the ground, such as target particles on a blade of grass, for example. In this case, the seed particles will remain attached to the target particle as well. One advantage of the charged seed cloud concept is reducing the loss of expensive seed particles that are carried too far downwind from the area of interest.

Turning to FIG. 7, a flow chart is shown that depicts the method 500 for deploying a charged seed cloud according to the present invention. The flow chart serves as a summary of the concepts described in the foregoing. At 510, the air vehicle that is used to release the seed particles is deployed to an altitude above the target particles to be identified, neutralized or eliminated. At 520, charge is applied to the seed particles and the charged seed particles are released from the air vehicle. At 525, particles that are heavier than the seed particles are opposite charged and released from the air vehicle in order to main charge neutrality of the air vehicle. The oppositely charged particles fall to the ground and do not interact with the seed cloud. At 530, a seed cloud is formed at altitude above the ground as a result of the seed cloud and an electric field E is formed between the seed cloud and ground. At 540, the electric field produce by the seed cloud causes the seed particles (at the bottom of the seed cloud) to move downward at a sufficient velocity to increase interaction between the seed particles and target particles. At 550, the electric field produced by the charged seed cloud induces a dipole charge distribution in the target particles so that the target particles are attracted (by opposite charge attraction forces) to the seed particles.

The system and methods described herein may be embodied in other specific forms without departing from the spirit or essential characteristics thereof. The foregoing embodiments are therefore to be considered in all respects illustrative and not meant to be limiting.

What is claimed is:

1. A method for increasing interaction between seed particles in a seed cloud and target particles, comprising applying a charge to the seed particles so that the seed cloud formed by release of the seed particles at an altitude above the ground is highly charged with respect to the ground, which in turn produces a strong electric field between the seed cloud and ground.

2. The method of claim 1, wherein applying comprises applying the charge at a strength sufficient to produce the electric field having a strength that is substantially greater than a fair-weather electric field caused by the earth, wherein the electric field produced by the seed cloud causes the seed particles in the seed cloud to move downward at sufficient velocity to increase interaction between the seed particles and target particles.

3. The method of claim 1, wherein applying comprises applying the charge at a strength sufficient to cause the electric field produced by the charged seed cloud to induce a dipole charge distribution in target particles so that the target particles are attracted to the seed particles.

4. The method of claim 1, and further comprising releasing the charged seed particles from an air vehicle to form the charged seed particle cloud.

5. The method of claim 4, and further comprising releasing from the air vehicle particles that are oppositely charged with respect to the charge of the seed particles to maintain charge neutrality of the air vehicle, and which oppositely charged particles are heavier than the seed particles so that they fall to the ground and do not interact with the seed cloud.

6. A method for deploying seed particles that are intended to interact with target particles, comprising:
    applying a charge to the seed particles and releasing the seed particles from an air vehicle at an altitude above the ground so that a seed cloud formed by the seed particles produces an electric field between the seed cloud and the ground, wherein the electric field is substantially stronger than an electric field produced by the earth; and
    releasing from the air vehicle particles that are oppositely charged with respect to the charge on the seed particles to maintain charge neutrality of the air vehicle, and which oppositely charged particles are heavier than the seed particles so that they fall to the ground and do not interact with the seed cloud.

7. The method of claim 6, wherein applying comprises applying the charge at a strength sufficient to cause the electric field produced by the charged seed cloud to induce a dipole charge distribution in target particles so that the target particles are attracted to the seed particles.

8. The method of claim 6, wherein applying comprises applying charge to the seed particles such that the electric field produced by the seed cloud causes the seed particles in the seed cloud to move downward at sufficient velocity to increase interaction between the seed particles and target particles.

9. A system for deploying a seed cloud from an air vehicle, comprising:
a. a first container that contains a plurality of first particles that are adapted to achieve a desired interaction with target particles;
b. a power supply configured to apply a charge to said plurality of first particles; and
c. a first tube coupled to the first container and extending from the air vehicle to release the first particles into the air so as to form a charged seed cloud at altitude above the earth thereby forming a strong electric field between the charged seed cloud and ground to enhance the desired interaction between the first particles and the target particles.

10. The system of claim 9, and further comprising a second container on the air vehicle, the second container comprising a plurality of second particles that are heavier than the first particles, and a second elongated tube that extends from the air vehicle and is coupled to the second container to release from the air vehicle the second particles that are oppositely charged with respect to the charge of the seed particles to maintain charge neutrality of the air vehicle.

11. The system of claim 10, wherein a distal end of the second tube from which the plurality of second particles are released is spaced a distance from the air vehicle so that the oppositely second particles do not interact with the seed cloud as they fall to the ground.

12. The system of claim 9, wherein the power supply applies the charge at a strength sufficient to the first particles to cause the electric field produced by the charged seed cloud to induce a dipole charge distribution in target particles so that the target particles are attracted to the first particles.

\* \* \* \* \*